United States Patent
Brennan et al.

(10) Patent No.: US 7,083,227 B2
(45) Date of Patent: *Aug. 1, 2006

(54) AUTOMOTIVE VEHICLE SEATING COMFORT SYSTEM

(75) Inventors: Lindy Brennan, Kingsville (CA); Goran Bajic, Windsor (CA); Lucas Fernandez, Windsor (CA); Valerija Drobnjakovic, Windsor (CA)

(73) Assignee: W.E.T. Automotive Systems, AG (DE)

( * ) Notice: Subject to any disclaimer, the term of this patent is extended or adjusted under 35 U.S.C. 154(b) by 0 days.

This patent is subject to a terminal disclaimer.

(21) Appl. No.: 11/077,440

(22) Filed: Mar. 10, 2005

(65) Prior Publication Data

US 2005/0161986 A1   Jul. 28, 2005

Related U.S. Application Data

(63) Continuation of application No. 10/681,555, filed on Oct. 8, 2003, now Pat. No. 6,869,139, which is a continuation of application No. 10/463,052, filed on Jun. 17, 2003, now Pat. No. 6,857,697.

(60) Provisional application No. 60/428,003, filed on Nov. 21, 2002, provisional application No. 60/407,198, filed on Aug. 29, 2002.

(51) Int. Cl.
  *A47C 7/74* (2006.01)
(52) U.S. Cl. .............................. 297/180.14; 297/452.42
(58) Field of Classification Search ........... 297/180.14, 297/180.13, 180.12, 180.11, 452.42
See application file for complete search history.

(56) References Cited

U.S. PATENT DOCUMENTS

| 374,424 A | 12/1887 | Ober |
| 390,154 A | 9/1888 | Beach |
| 1,370,832 A | 3/1921 | Mollberg |
| 1,439,681 A | 12/1922 | Alkire et al. |
| 1,475,912 A | 11/1923 | Williams |
| 1,514,329 A | 11/1924 | Metcalf |
| 1,537,460 A | 5/1925 | Campbell et al. |

(Continued)

FOREIGN PATENT DOCUMENTS

CA      1266925      7/1960

(Continued)

OTHER PUBLICATIONS

Automotive Heated Seats—Heated Steering Wheels, IGB Automotive Ltd., received by Assignee W.E.T. Automotive Systems, May 2003.

(Continued)

*Primary Examiner*—Peter M. Cuomo
*Assistant Examiner*—Sarah B. McPartlin
(74) *Attorney, Agent, or Firm*—Dobrusin & Thennisch PC

(57) ABSTRACT

There is disclosed an automotive vehicle seating comfort system for providing heating, cooling, ventilation or a combination thereof to an individual in an automotive car seat. The system typically includes an insert, a blower and a tubular structure for providing fluid communication between the insert and blower for providing ventilation and/or cooling for the individual. Preferably, the insert includes a heater or heater layer for providing heat for the individual.

20 Claims, 2 Drawing Sheets

U.S. PATENT DOCUMENTS

| | | |
|---|---|---|
| 1,541,213 A | 6/1925 | Harley |
| 1,593,066 A | 7/1926 | Gaston |
| 1,664,636 A | 4/1928 | Mayer |
| 1,837,515 A | 12/1931 | Bachrach |
| 1,936,960 A | 11/1933 | Bowman |
| 2,022,959 A | 12/1935 | Gordon |
| 2,103,553 A | 12/1937 | Reynolds |
| 2,158,801 A | 5/1939 | Petterson |
| 2,336,089 A | 12/1943 | Gould |
| 2,493,303 A | 1/1950 | McCullough |
| 2,544,506 A | 3/1951 | Kronhaus |
| 2,703,134 A | 3/1955 | Mossor |
| 2,749,906 A | 6/1956 | O'Connor |
| 2,758,532 A | 8/1956 | Awe |
| 2,782,834 A | 2/1957 | Vigo |
| 2,791,956 A | 5/1957 | Guest |
| 2,826,135 A | 3/1958 | Benzick |
| 2,912,832 A | 11/1959 | Clark |
| 2,931,286 A | 4/1960 | Fry, Sr. et al. |
| 2,976,700 A | 3/1961 | Jackson |
| 2,978,972 A | 4/1961 | Hake |
| 2,992,604 A | 7/1961 | Trotman et al. |
| 2,992,605 A | 7/1961 | Trotman et al. |
| 3,030,145 A | 4/1962 | Kottemann |
| 3,101,037 A | 8/1963 | Taylor |
| 3,101,660 A | 8/1963 | Taylor |
| 3,127,931 A | 4/1964 | Johnson |
| 3,131,967 A | 5/1964 | Spaulding |
| 3,136,577 A | 6/1964 | Richard |
| 3,137,523 A | 6/1964 | Karner |
| 3,162,489 A | 12/1964 | Trotman |
| 3,209,380 A | 10/1965 | Watsky |
| 3,486,177 A | 12/1969 | Marshack |
| 3,529,310 A | 9/1970 | Olmo |
| 3,550,523 A | 12/1970 | Segal |
| 3,552,133 A | 1/1971 | Lukomsky |
| 3,628,829 A | 12/1971 | Hellig |
| 3,638,255 A | 2/1972 | Sterrett |
| 3,653,589 A | 4/1972 | McGrath |
| 3,653,590 A | 4/1972 | Elsea |
| 3,681,797 A | 8/1972 | Messner |
| 3,684,170 A | 8/1972 | Roof |
| 3,732,944 A | 5/1973 | Kendall |
| 3,736,022 A | 5/1973 | Radke |
| 3,738,702 A | 6/1973 | Jacobs |
| 3,757,366 A | 9/1973 | Sacher |
| 3,770,318 A | 11/1973 | Fenton |
| 3,778,851 A | 12/1973 | Howorth |
| 3,948,246 A | 4/1976 | Jenkins |
| 4,002,108 A | 1/1977 | Drori |
| 4,043,544 A | 8/1977 | Ismer |
| 4,044,221 A | 8/1977 | Kuhn |
| 4,060,276 A | 11/1977 | Lindsay |
| 4,065,936 A | 1/1978 | Fenton et al. |
| 4,072,344 A | 2/1978 | Li |
| 4,141,585 A | 2/1979 | Blackman |
| 4,175,297 A | 11/1979 | Robbins et al. |
| 4,245,149 A | 1/1981 | Fairlie |
| 4,259,896 A | 4/1981 | Hayashi et al. |
| 4,268,272 A | 5/1981 | Taura |
| 4,335,725 A | 6/1982 | Geldmacher |
| 4,379,352 A | 4/1983 | Hauslein et al. |
| 4,391,009 A | 7/1983 | Schild et al. |
| 4,413,857 A | 11/1983 | Hayashi |
| 4,509,792 A | 4/1985 | Wang |
| 4,563,387 A | 1/1986 | Takagi et al. |
| 4,572,430 A | 2/1986 | Takagi et al. |
| 4,589,656 A | 5/1986 | Baldwin |
| 4,665,707 A | 5/1987 | Hamilton |
| 4,671,567 A | 6/1987 | Frobose |
| 4,685,727 A | 8/1987 | Cremer et al. |
| 4,712,832 A | 12/1987 | Antolini et al. |
| 4,729,598 A | 3/1988 | Hess |
| 4,777,802 A | 10/1988 | Feher |
| 4,847,933 A | 7/1989 | Bedford |
| 4,853,992 A | 8/1989 | Yu |
| 4,866,800 A | 9/1989 | Bedford |
| 4,905,475 A | 3/1990 | Tuomi |
| 4,923,248 A | 5/1990 | Feher |
| 4,946,220 A | 8/1990 | Wyon et al. |
| 4,964,674 A | 10/1990 | Altmann et al. |
| 4,981,324 A | 1/1991 | Law |
| 4,997,230 A | 3/1991 | Spitalnick |
| 5,002,336 A | 3/1991 | Feher |
| 5,004,294 A | 4/1991 | Lin |
| 5,016,302 A | 5/1991 | Yu |
| 5,102,189 A | 4/1992 | Saito et al. |
| 5,106,161 A | 4/1992 | Meiller |
| 5,117,638 A | 6/1992 | Feher |
| 5,138,851 A | 8/1992 | Mardikian |
| 5,160,517 A | 11/1992 | Hicks et al. |
| 5,211,697 A | 5/1993 | Kienlein et al. |
| 5,226,188 A | 7/1993 | Liou |
| 5,292,577 A | 3/1994 | Van Kerrebrouck et al. |
| 5,335,381 A | 8/1994 | Chang |
| 5,354,117 A | 10/1994 | Danielson et al. |
| 5,356,205 A | 10/1994 | Calvert et al. |
| 5,370,439 A | 12/1994 | Lowe et al. |
| 5,372,402 A | 12/1994 | Kuo |
| 5,382,075 A | 1/1995 | Shih |
| 5,385,382 A | 1/1995 | Single, II et al. |
| 5,403,065 A | 4/1995 | Callerio |
| 5,408,711 A | 4/1995 | McClelland |
| 5,411,318 A | 5/1995 | Law |
| 5,416,935 A | 5/1995 | Nieh |
| 5,450,894 A | 9/1995 | Inoue et al. |
| 5,516,189 A | 5/1996 | Ligeras |
| 5,524,439 A | 6/1996 | Gallup et al. |
| 5,561,875 A | 10/1996 | Graebe |
| 5,590,428 A | 1/1997 | Roter |
| 5,597,200 A | 1/1997 | Gregory et al. |
| 5,613,729 A | 3/1997 | Summer, Jr. |
| 5,613,730 A | 3/1997 | Buie et al. |
| 5,626,021 A | 5/1997 | Karunasiri et al. |
| 5,626,386 A | 5/1997 | Lush |
| 5,626,387 A | 5/1997 | Yeh |
| 5,639,145 A | 6/1997 | Alderman |
| 5,645,314 A | 7/1997 | Liou |
| 5,692,952 A | 12/1997 | Chih-Hung |
| 5,701,621 A | 12/1997 | Landi et al. |
| 5,715,695 A | 2/1998 | Lord |
| 5,787,534 A | 8/1998 | Hargest et al. |
| 5,833,309 A | 11/1998 | Schmitz |
| 5,833,321 A | 11/1998 | Kim et al. |
| 5,887,304 A | 3/1999 | Von der Heyde |
| 5,897,162 A | 4/1999 | Humes et al. |
| 5,902,014 A | 5/1999 | Dinkel et al. |
| 5,918,930 A | 7/1999 | Kawai et al. |
| 5,921,100 A | 7/1999 | Yoshinori et al. |
| 5,921,314 A | 7/1999 | Schuller et al. |
| 5,921,858 A | 7/1999 | Kawai et al. |
| 5,924,766 A | 7/1999 | Esaki et al. |
| 5,924,767 A | 7/1999 | Pietryga |
| 5,927,817 A | 7/1999 | Ekman et al. |
| 5,934,748 A | 8/1999 | Faust et al. |
| 6,003,950 A | 12/1999 | Larsson |
| 6,019,420 A | 2/2000 | Faust et al. |
| 6,048,024 A | 4/2000 | Wallman |
| 6,049,927 A | 4/2000 | Thomas et al. |
| 6,059,018 A | 5/2000 | Yoshinori et al. |
| 6,059,362 A | 5/2000 | Lin |
| 6,062,641 A | 5/2000 | Suzuki et al. |
| 6,064,037 A | 5/2000 | Weiss et al. |
| 6,068,332 A | 5/2000 | Faust et al. |

| | | | | | | |
|---|---|---|---|---|---|---|
| 6,079,485 | A | 6/2000 | Esaki et al. | 2001/0035669 A1 | 11/2001 | Andersson et al. |
| 6,085,369 | A | 7/2000 | Feher | 2002/0003362 A1* | 1/2002 | Kunkel et al. ......... 297/180.14 |
| 6,105,667 | A | 8/2000 | Yoshinori et al. | 2002/0003363 A1* | 1/2002 | Buss et al. ............. 297/180.14 |
| 6,109,688 | A | 8/2000 | Wurz et al. | 2002/0017102 A1 | 2/2002 | Bell |
| 6,119,463 | A | 9/2000 | Bell | 2002/0092308 A1 | 7/2002 | Bell |
| 6,124,577 | A | 9/2000 | Fristedt | 2002/0096915 A1 | 7/2002 | Haupt et al. |
| 6,145,925 | A | 11/2000 | Eksin et al. | 2002/0096931 A1 | 7/2002 | White et al. |
| 6,147,332 | A | 11/2000 | Holmberg et al. | 2002/0105213 A1 | 8/2002 | Rauh et al. |
| 6,164,719 | A | 12/2000 | Rauh | 2002/0108381 A1 | 8/2002 | Bell |
| 6,179,706 | B1 | 1/2001 | Yoshinori et al. | 2002/0139123 A1 | 10/2002 | Bell |
| 6,186,592 | B1 | 2/2001 | Orizaris et al. | 2002/0140258 A1 | 10/2002 | Ekern et al. |
| 6,189,966 | B1 | 2/2001 | Faust et al. | 2002/0148234 A1 | 10/2002 | Bell |
| 6,196,627 | B1 | 3/2001 | Faust et al. | 2002/0148235 A1 | 10/2002 | Bell |
| 6,223,539 | B1 | 5/2001 | Bell | 2002/0148236 A1 | 10/2002 | Bell |
| 6,224,150 | B1 | 5/2001 | Eksin et al. | 2002/0148345 A1 | 10/2002 | Hagiwari et al. |
| 6,237,675 | B1 | 5/2001 | Oehring et al. | 2002/0150478 A1 | 10/2002 | Aoki |
| 6,254,179 | B1 | 7/2001 | Kortum et al. | 2003/0005706 A1 | 1/2003 | Bell |
| 6,263,530 | B1 | 7/2001 | Feher | 2003/0024924 A1 | 2/2003 | Fristedt |
| 6,273,810 | B1 | 8/2001 | Rhodes et al. | 2003/0029173 A1 | 2/2003 | Bell et al. |
| 6,277,023 | B1 | 8/2001 | Schwartz | 2003/0079770 A1 | 5/2003 | Bell |
| 6,278,090 | B1 | 8/2001 | Fristedt et al. | 2003/0084935 A1 | 5/2003 | Bell |
| 6,291,803 | B1 | 9/2001 | Fourrey | 2003/0102699 A1 | 6/2003 | Aoki et al. |
| 6,300,150 | B1 | 10/2001 | Venkatasubramanian | 2003/0150229 A1 | 8/2003 | Aoki et al. |
| 6,321,996 | B1 | 11/2001 | Odebrecht et al. | 2004/0036326 A1 | 2/2004 | Bajic et al. |
| 6,415,501 | B1 | 7/2002 | Schlesselman | 2004/0104607 A1 | 6/2004 | Takeshi et al. |
| 6,425,637 | B1 | 7/2002 | Peterson | 2004/0118555 A1 | 6/2004 | Fristedt et al. |
| 6,434,328 | B1 | 8/2002 | Rutherford | 2004/0139758 A1 | 7/2004 | Toshifumi et al. |
| 6,481,801 | B1 | 11/2002 | Schmale | 2004/0189061 A1* | 9/2004 | Hartwich et al. ...... 297/180.14 |
| 6,483,087 | B1 | 11/2002 | Gardner et al. | 2004/0195870 A1 | 10/2004 | Bohlender et al. |
| 6,491,578 | B1 | 12/2002 | Yoshinori et al. | 2004/0245811 A1 | 12/2004 | Bevan et al. |
| 6,497,275 | B1 | 12/2002 | Elliot | 2005/0127723 A1 | 6/2005 | Bajic et al. |
| 6,501,055 | B1 | 12/2002 | Rock et al. | 2005/0200179 A1 | 9/2005 | Bevan et al. |
| 6,505,886 | B1 | 1/2003 | Gielda et al. | 2005/0257541 A1 | 11/2005 | Kadle et al. |
| 6,511,125 | B1 | 1/2003 | Gendron | 2005/0264086 A1 | 12/2005 | Lofy et al. |
| 6,539,725 | B1 | 4/2003 | Bell | | FOREIGN PATENT DOCUMENTS | |
| 6,541,737 | B1 | 4/2003 | Eksin et al. | | | |
| RE38,128 | E | 6/2003 | Gallup et al. | | | |
| 6,578,910 | B1 | 6/2003 | Andersson et al. | CA | 2393970 | 6/2001 |
| 6,592,181 | B1 | 7/2003 | Stiller et al. | DE | 3513909 | 10/1986 |
| 6,598,405 | B1 | 7/2003 | Bell | DE | 37 05 756 A1 | 10/1988 |
| 6,604,785 | B1 | 8/2003 | Bargheer et al. | DE | 3705756 | 10/1988 |
| 6,606,866 | B1 | 8/2003 | Bell | DE | 4112631 | 4/1992 |
| 6,619,736 | B1 | 9/2003 | Stowe et al. | DE | 19503291 | 8/1996 |
| 6,625,990 | B1 | 9/2003 | Bell | DE | 197 36 951 A1 | 3/1999 |
| 6,626,386 | B1 | 9/2003 | Stiner et al. | DE | 19736951 | 3/1999 |
| 6,626,455 | B1 | 9/2003 | Webber et al. | DE | 19737636 | 3/1999 |
| 6,626,488 | B1 | 9/2003 | Pfahler | DE | 19810936 | 9/1999 |
| 6,629,724 | B1 | 10/2003 | Ekern et al. | DE | 199 20 451 A1 | 12/1999 |
| 6,629,725 | B1* | 10/2003 | Kunkel et al. ......... 297/180.12 | DE | 19920451 | 12/1999 |
| 6,682,140 | B1 | 1/2004 | Minuth et al. | DE | 199 54 97 C1 | 1/2001 |
| 6,685,553 | B1 | 2/2004 | Aoki | DE | 19954978 | 1/2001 |
| 6,719,624 | B1 | 4/2004 | Hayashi et al. | DE | 100 01 314 A1 | 7/2001 |
| 6,722,148 | B1 | 4/2004 | Aoki et al. | DE | 10001314 | 7/2001 |
| 6,727,467 | B1 | 4/2004 | Hadzizukic et al. | DE | 100 24 880 C1 | 9/2001 |
| 6,761,399 | B1 | 7/2004 | Bargheer et al. | DE | 10024880 | 9/2001 |
| 6,767,621 | B1 | 7/2004 | Flick et al. | DE | 10030708 | 1/2002 |
| 6,786,541 | B1* | 9/2004 | Haupt et al. ............. 297/180.1 | EP | 0128534 | 12/1984 |
| 6,786,545 | B1 | 9/2004 | Bargheer et al. | EP | 0280213 | 8/1988 |
| 6,793,016 | B1 | 9/2004 | Aoki et al. | EP | 0 517 615 A1 | 12/1992 |
| 6,808,230 | B1 | 10/2004 | Buss et al. | EP | 0517615 | 12/1992 |
| 6,817,675 | B1* | 11/2004 | Buss et al. ............... 297/452.6 | EP | 411375 | 5/1994 |
| 6,828,528 | B1 | 12/2004 | Stowe et al. | EP | 0809576 | 5/1999 |
| 6,848,742 | B1 | 2/2005 | Aoki et al. | EP | 0 936 105 A1 | 8/1999 |
| 6,857,697 | B1 | 2/2005 | Brennan et al. | EP | 0936105 | 8/1999 |
| 6,869,139 | B1 | 3/2005 | Brennan et al. | EP | 0730720 | 7/2000 |
| 6,869,140 | B1 | 3/2005 | White et al. | EP | 1088696 | 9/2000 |
| 6,871,696 | B1 | 3/2005 | Aoki et al. | EP | 1 075 984 A2 | 2/2001 |
| 6,886,352 | B1 | 5/2005 | Yoshinori et al. | EP | 1123834 | 2/2001 |
| 6,892,807 | B1 | 5/2005 | Fristedt et al. | EP | 1 075 984 B1 | 5/2003 |
| 6,893,086 | B1 | 5/2005 | Bajic et al. | EP | 1075984 | 5/2003 |
| 6,929,322 | B1 | 8/2005 | Aoki et al. | EP | 1349746 | 8/2005 |
| 6,957,545 | B1 | 10/2005 | Aoki et al. | FR | 1266925 | 9/1960 |
| 6,976,734 | B1 | 12/2005 | Stoewe | FR | 2599683 | 6/1986 |

| | | |
|----|----------------|---------|
| FR | 2 630 056 | 10/1989 |
| FR | 2630056 | 10/1989 |
| FR | 2694527 | 2/1994 |
| JP | 1171509 | 7/1989 |
| JP | 5277020 | 10/1993 |
| JP | 8285423 | 11/1996 |
| JP | 10044756 | 2/1998 |
| JP | 2002125801 | 2/2002 |
| JP | 2002125801 | 5/2002 |
| JP | 2003042594 | 2/2003 |
| WO | WO9409684 | 5/1994 |
| WO | WO96/05475 | 2/1996 |
| WO | WO97/09908 | 3/1997 |
| WO | WO99/00268 | 1/1999 |
| WO | WO02/06914 | 1/2002 |
| WO | WO 02/06914 A1 | 1/2002 |
| WO | WO02/05341 | 7/2002 |
| WO | WO 03/015583 A2 | 2/2003 |
| WO | WO2004/082989 | 3/2004 |

OTHER PUBLICATIONS

Automotive Seat Heating Systems, Bauerhin International, received by Assignee W.E.T. Automotive Systems, May 2002.
Copending U.S. Appl. No. 09/619,171, Jul. 19, 2000.
Copending U.S. Appl. No. 09/755,505, Jan. 5, 2001.
Copending U.S. Appl. No. 09/755,506, Jan. 5, 2001.
Copending U.S. Appl. No. 09/755,637, Jan. 5, 2001.
Copending U.S. Appl. No. 10/434,890, May 1, 2003.
Excerpt from website http://www.icar.com/html_pages /about_icar/current_events_news/advantage/advantageI-Car Advantage Online.
Excerpt from website http://www.seatcomfort.com/semashow1.htm, Specializing in Seat Ventilation and Heating Systems, Seat Comfort Systems Unveils 3 New Seat Heater Products.
Excerpt from website http://www.seatcomfort.com/ventilation.htm, Specializing in Seat Ventilation and Heating Systems, Ventilation.
GMT 830 Heating & Ventilation System, IGB Automotive Ltd., received by Assignee W.E.T. Automotive Systems, Jun. 2003.
International Search Report for Application Serial No. PCT/US03/19929, Oct. 10, 2003.
Komfortabel bei jeder Temperatur.
Seat Heating Systems, Kongsberg Automotive, believed to be from websitehttp://www.kongsberg-automotive.no/.
Copending U.S. Appl. No. 11/186,076, Jul. 21, 2005.
Copending U.S. Appl. No. 10/966,653, Oct. 15, 2004.
Copending U.S. Appl. No. 11/966,652, Oct. 15, 2004.
Copending U.S. Appl. No. 11/001,294, Dec. 1, 2004.
Copending U.S. Appl. No. 10/822,518, Apr. 12, 2004.
Copending U.S. Appl. No. 10/822,405, Apr. 12, 2004.
Copending U.S. Appl. No. 11/263,642, Oct. 31, 2005.

* cited by examiner

AUTOMOTIVE VEHICLE SEATING COMFORT SYSTEM

CLAIM OF PRIORITY

The present invention is a continuation of U.S. application Ser. No. 10/681,555 filed Oct. 8, 2003, which is a continuation of U.S. application Ser. No. 10/463,052 filed Jun. 17, 2003, which claims the benefit of U.S. Provisional Applications Ser. No. 60/407,198 filed Aug. 29, 2002 and Ser. No. 60/428,003 filed Nov. 21, 2002, the contents of which are incorporated by reference herein for all purposes.

FIELD OF THE INVENTION

The present invention relates generally to automotive vehicle seats, and more particularly to seating comfort system for providing heating, cooling, ventilation or a combination thereof to an occupant of a seat of an automotive vehicle.

BACKGROUND OF THE INVENTION

For many years the transportation industry has been concerned with designing seats for automotive vehicles that provide added comfort to occupants in the seats. Various innovations in providing seating comfort are discussed in U.S. Pat. Nos. 6,064,037; 5,921,314; 5,403,065; 6,048,024 and 6,003,950, all of which are expressly incorporated herein by reference for all purposes. In the interest of continuing such innovation, the present invention provides an improved seating system, insert for a seat or both, which are preferably suitable for employment within or as part of an automotive vehicle seat and which assist in providing comfort control to an occupant in the seat.

There is believed to be a need for an improved system for seating comfort pursuant to which an insert (which is not encapsulated or otherwise sealed along its edges) is provided for performing the seating comfort functions. There is also believed to be a need for a system in which a blower is employed for applying positive pressure to blow air with a comfort system.

SUMMARY OF THE INVENTION

Accordingly, the present invention provides a ventilated seat having a seating comfort system. The vehicle seat includes a seat cushion component and a seat backrest component, at least one of which provides a seat cushion and an air-permeable trim surface at the occupant contact areas of the seat. The system includes an insert located beneath the trim surface of each ventilated component. The insert includes a first layer having a heater integrated therein and a second layer formed of spacer material wherein the second layer defines an open space. The system also includes a positive pressure blower in fluid communication with the insert for moving air through the open space and at least partially past an occupant in the seat. A tubular structure is preferably provided in the system for providing the fluid communication between the insert and the fluid mover.

BRIEF DESCRIPTION OF THE DRAWINGS

The features and inventive aspects of the present invention will become more apparent upon reading the following detailed description, claims and drawings, of which the following is a brief description:

DETAILED DESCRIPTION OF THE INVENTION

The present invention is predicated upon providing a seating system for an automotive vehicle wherein the system is configured to provide heating, cooling, ventilation or a combination thereof to an occupant in a seat. The system will typically include an insert having a heater and a fluid or air blower (preferably one in which fluids are displaced by blowing under a positive pressure). The system may also include a structure for facilitating fluid communication between the insert and the blower. The insert will typically include at least one layer, but more typically includes multiple (e.g., two or three or more) layers. One of the layers incorporates a heater and is therefore referred to herein as a heater layer. Preferably, one or more of the layers is a spacer layer for providing open space for fluid flow within and through the insert.

Figure 1:
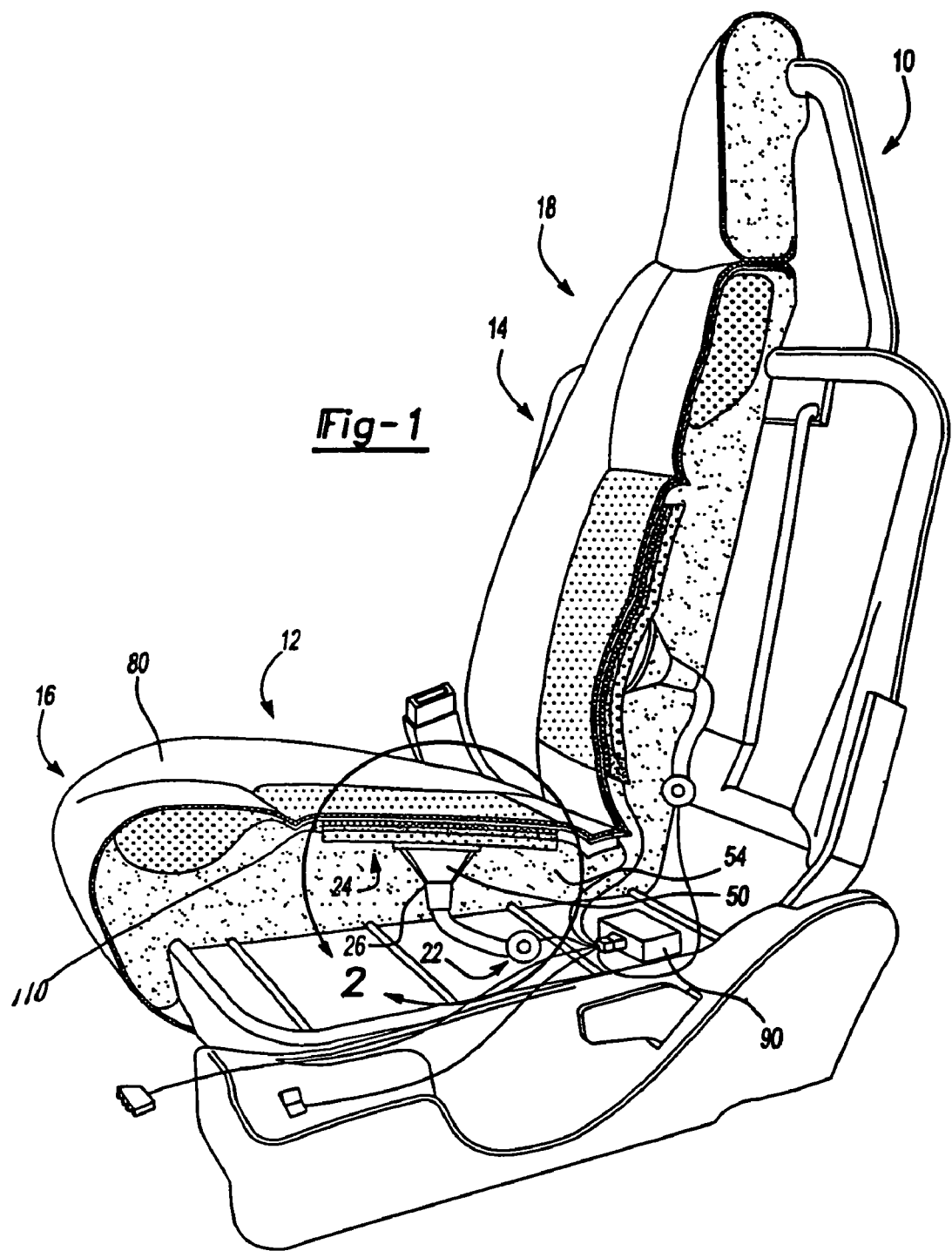
FIG. 1 is a cut-away perspective view of a vehicle seat having a comfort system in accordance with an exemplary aspect of the present invention.
Figure 2:
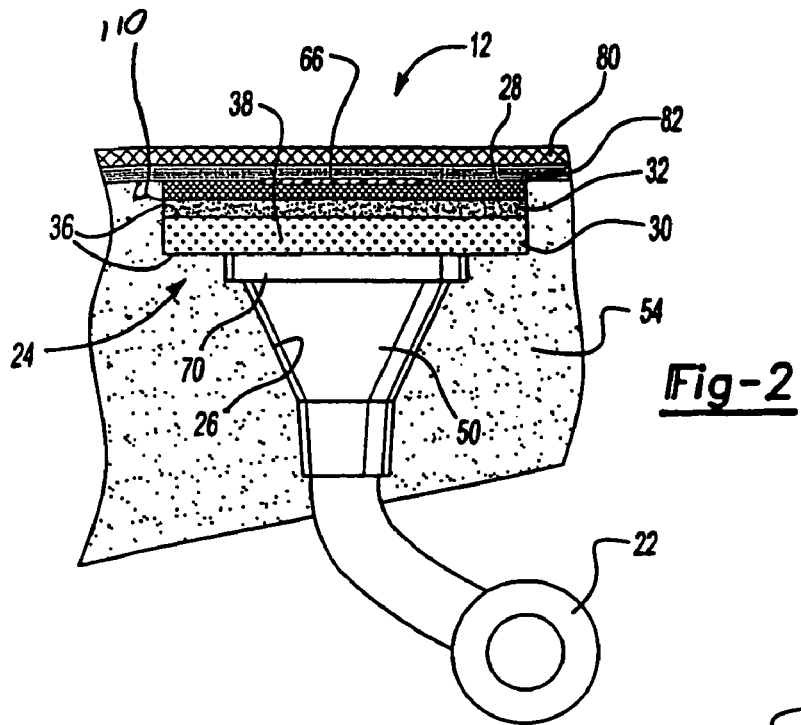
FIG. 2 is a sectional view of a portion 2—2 of the vehicle seat of FIG. 1.

Referring to FIGS. 1 and 2, there is illustrated a vehicle seat 10 having a pair of exemplary seating comfort systems 12, 14 according to a preferred aspect of the present invention. As shown, one system 12 may be located in a seat cushion component 16 of the seat 10 while the other system 14 may be located in a seat backrest component 18 of the seat 10. Either of the systems may be omitted as well. The systems 12, 14 are substantially identical to each other, and therefore, the discussion shall focus on the system 12 in the seat cushion component 16 of the seat 10. It shall be understood, however, that multiple systems may be employed in one seat and the systems may be associated with or incorporated into the seat cushion component 16, the seat backrest component 18, other portions of the seat 10 or a combination thereof.

The system 12 includes a fluid mover shown as a blower 22 in fluid communication with an insert 24 via a duct (e.g., a tubular structure) 26. By "tubular" as used herein, the shape of the tube may vary and can be rounded, have edges, corners or the like. The insert 24 typically includes multiple layers laminated together and preferably includes a heater for providing warmth to a seat occupant and an open space for ventilation fluid flow. In the preferred embodiment, the insert 24 includes a heater layer 28 and a spacer layer 30, which are laminated and adhered together with an adhesive or adhesive layer 32. A preferred construction is one in which the insert is open at its sides and is not encapsulated.

Various different types of heaters are suitable for incorporation into a car seat and it is contemplated that any of such heaters may be incorporated into the insert 24 of the present invention. Such heaters typically incorporate flexible electrical substantially flat heating elements. As examples, a lay-wire heater, a carbon fiber heater or the like, which are typically supported with a backing (e.g., a cloth or fabric type backing) may be used within the insert. In a preferred embodiment, the heater layer 28 is a carbon fiber type heater with a backing (e.g., a non-woven layer). Preferably, the heater layer, the backing or both are breathable for allowing air to pass therethrough. One exemplary preferred heater is sold under the tradename CARBOTEX® and is commercially available from W.E.T. Automotive Systems, Inc. in Germany and/or FTG Fraser-Technik GmbH, Schleizer Strasse 56–58, D-95028 Hot/Saale, Germany. An example of such a heater is disclosed in U.S. Pat. No. 6,064,037, issued May 16, 2000, herein expressly incorporated by reference for all purposes.

It is contemplated that a buffer layer may be incorporated into the insert 24 adjacent the heater layer 28. Preferably, the buffer layer is a layer of gauze which is capable of protecting the heater layer 24 although various alternative protective materials may be used such as cloth, fleece or the like. Just like the other layers, it is preferable that the buffer layer is breathable or permeable for allowing fluid flow therethrough.

The adhesive of the insert 24 may be supplied in layers, drops or in a variety of other configurations. In the preferred embodiment depicted, the adhesive layer 32 of the insert 24 is disposed between the heater layer 28 and the spacer layer 30 for adhering the layers 28, 30 together. The adhesive layer 32 is preferably formed of a hot melt adhesive, although it is not necessarily required, and may be other adhesives as well. The adhesive may be provided as a web or otherwise and may be continuous or non continuous (e.g., may be applied in drops, dabs or the like). The adhesive layer 32 may include an adhesive selected from polyamides, polyesters, elastomers, vinyl acetates, acrylics, urethanes, olefin polymers or a combination thereof. Moreover, the adhesive may be formulated as desired for particular processing parameters or conditions. Preferably, the adhesive layer is substantially free of anti-blocking solutions, blowing additives, process contaminants or the like which might interfere with adhesive performance. As an example, one suitable hot melt adhesive is commercially available as a non-woven web under the tradename SPUNFAB® from Spunfab, Ltd. 175 Muffin Lane, Cuyahoga Falls, Ohio 44223.

The spacer layer 30 is preferably formed of a spacer material. The spacer material may be provided as a variety of synthetic materials such as plastic or polymeric materials, padding and stuffing materials, lining and carrier materials or the like. Preferably, the spacer material provides open space within the layer 30 while remaining at least partially pliable or flexible. As one example, the spacer layer may be provided as a plurality of rubber, foam plastic or other members or fibers. The members or fibers are preferably spaced apart from each other to provide open space therebetween while still being close enough together to provide cushion and support. As another example the spacer layer 30 may be formed of a 3-dimensional spacer fabric structure or material.

In the preferred embodiment depicted, the spacer layer 30 is formed of polymeric (e.g., polyester) strand material that is interwoven to provide opposing honeycomb structures 36 (e.g., fabric panels), which are interconnected by several additional polymeric strand materials to provide open space 38 between the structures 36 while still providing cushion and support. As an example, one preferred material is sold under the tradename 3MESH® and is commercially available from Müller Textil GmbH, Germany or Müller Textiles, Inc., R.I., USA. In a particularly preferred embodiment, one or more of the honeycomb structures 36 include a finer filament polymeric strand material than the rest of spacer layer 30 for assisting adhesion of the spacer layer 30 to other materials.

Figure 4:
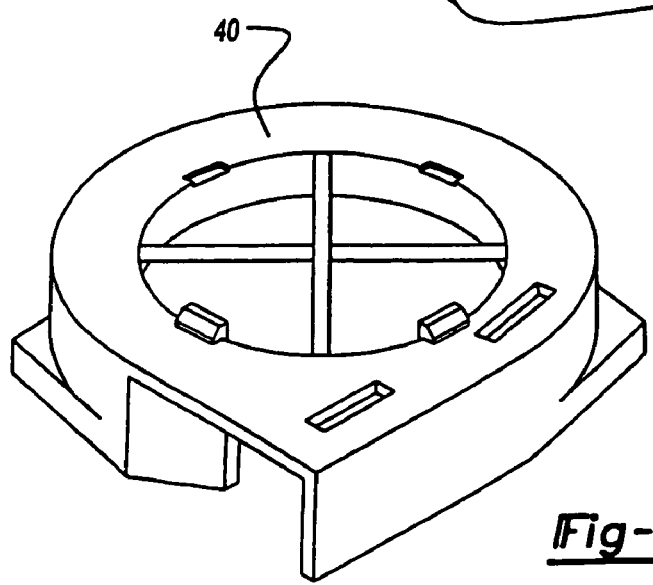
FIG. 4 is a perspective view of an exemplary blower housing suitable for application in the system of the present invention.

The blower 22 of FIGS. 1 and 2, a housing 40 of which is shown in FIG. 4 (e.g., adapted for snap fit connection to a mounting surface), may be positioned in a variety of locations within or outside the seat 10. Moreover, it is contemplated that the blower 22 may be secured to the seat 10 or to other vehicle components with a variety of attachments (e.g., fasteners, sewing, mating threaded attachments, quick connects, snap fits or the like). Further, it is contemplated that the blower 22 may include fingerguards, deflectors or the like.

The tubular structure 26 may be supplied in a variety of configurations and may be integrated with or separate from a variety of components (e.g., the seat, the insert, the blower or the like) and preferably provides for fluid communication between the insert 24 and the blower 22. As an example, it is contemplated that the tubular structure 26 may be integrated into portions of the seat 10 such as the foam cushions. As an alternative example, the tubular structure may be supplied as a separate component (e.g., a separate preferably flexible tube). As still another alternative example, the tubular structure may be integral with the insert 24, the blower 22, the seat 10 or a combination thereof. It is also contemplated that the tubular structure may be provided as a combination of any of the above examples.

In FIGS. 1 and 2, the tubular structure 26 is provided by a foam cushion 34 of the seat 10 and the structure 26 defines a passageway 50 (e.g., through-hole) extending through the foam cushion 54 for interconnecting the insert 24 and the blower 22 and providing fluid communication therebetween. As shown, particularly in FIG. 1, such a tubular structure 26, (e.g., including an enlarged passageway 50) may extend through the foam cushion in either the seat cushion component 16 or the seat backrest component 18 of the seat 10. In the embodiment depicted, fluid communication between the tubular structure 26 and the blower 22 and fluid communication between the tubular structure 26 and the insert 24 are substantially direct, however, such is not necessarily required. In a highly preferred embodiment, a portion of a wall of the tubular structure 26 nearest the forward edge of the seat cushion component 16 is at an angle between about 20 degrees and about 60 degrees (e.g., about 45 degrees) relative to another portion of the wall of the tubular structure 26 that is nearest a rearward edge of the seat cushion component 16.

Preferably, the tubular structure 26 provides a substantially fluid-tight (e.g., air tight) connection with the insert 24. To aid in this, the enlarged portion 50 may be formed, in dense form or as a foam. The walls of the tubular structure 26 are preferably coated or lined with a densified layer, such as by providing the tubular structure 26 (e.g., foam walls) with a coating such as a silicon coating, or by providing the tubular structure 26 with a lining (e.g., a polymer lining, a tape lining or the like).

Figure 3:
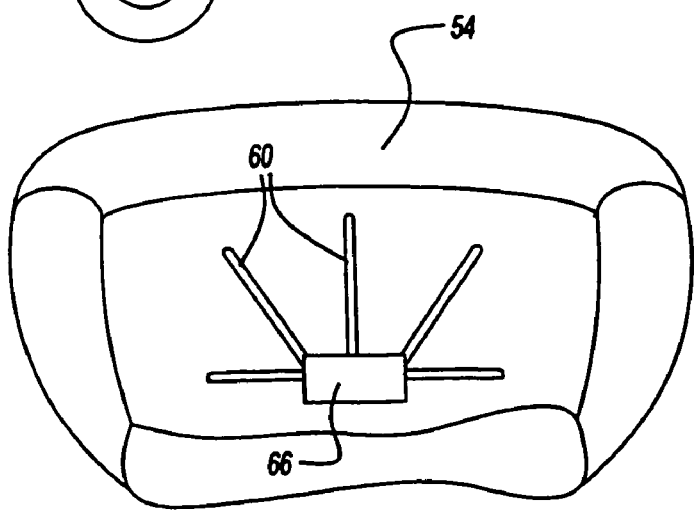
FIG. 3 is a perspective view of a seat cushion suitable for use in a comfort system in accordance with an exemplary aspect of the present invention.

As an additional option, the system 10 of the present invention may include one or more additional sub-passageways or openings for assisting in guiding fluid flow between the blower 22 and the insert 24. The sub-passageways may be defined by structures separate from the seat 10 or the insert 24 or may be integral therewith. In FIG. 3, a plurality of sub-passageways 60 are supplied as channels that are formed in the foam cushion 54. Preferably, the sub-passageway 60 extends radially away from the passageway 50 through the cushion 54. Also, as shown in FIG. 3, it is contemplated that a deflector 66 (e.g., a strip of tape) may be placed over the passageway 50 of the cushion 54 for assisting in directing fluid radially away from the passageway 50 and particularly through the sub-passageways 60.

The insert 24 is preferably assembled to the seat 10 by placing the insert 24 in overlaying relation with the cushion 54 such that the insert 24 covers the passageway 50, the sub-passageways 60 or both. In the depicted embodiment, a support 70 (e.g., a plastic panel with through-holes extending therethrough) is placed over the passageway 50 for providing continuity of support along with the cushion 54. The insert 24 is then placed within one or more cavities 74 in the cushion 54.

The insert 24 may be positioned upon the cushion 54 in a pre-assembled condition or the components or layers (e.g., the spacer layer, the adhesive layer, the heater layer or combinations thereof) may be applied separately. In a preferred embodiment, the spacer layer 30 is laminated to the heater layer 28 with the adhesive layer 32 therebetween to adhere the spacer layer 30 to the heater layer 28. It is contemplated that lamination may be effected by feeding the various layers 28, 30, 32 to a laminator (e.g., a belt and roller laminator, a stationary laminator or the like) or otherwise. If desired, the insert 24 may be adhered, fastened or otherwise attached to the cushion 54 of the seat 10.

One or more trim layers 80, 82 are assembled to the seat 10 to cover the cushion 54, the insert 24 or both. Preferably, the trim layers 80, 82 are fluid (e.g., air) permeable or breathable. In the preferred embodiment, the system 12 includes an outer trim layer 80 of permeable (e.g., perforated) leather or cloth and an inner trim layer 82 that is formed of a breathable padding material. As shown, the heater layer 28 is preferably closer to the trim layers 80, 82 than the spacer layer 30 although not required.

Operation

In operation, the system 10 of the present invention can preferably provide heating, cooling, ventilation or a combination thereof to an occupant of a seat having the system 10. In particular, if heat is desired, electric current can be induced to travel through the heater layer 28 by a control unit 90 or otherwise such that the heater layer 28 can provide heat to the occupant.

Alternatively, if cooling or ventilation is desired, the blower 22 can be operated via the control unit 90 or otherwise to blow air through the passageway 50, the sub-passageways 60 or both and through the open space 38 of the spacer layer 30 of the insert 24. Such air preferably flows at least partially past the occupant of the seat before or after flowing through the trim layers 80, 82 thereby providing ventilation to the occupant and providing convective heat transfer away from the occupant via the flowing air.

Although, it may be preferable for only the heater layer 28 or the ventilation system (i.e., the blower 22) to be running at one time, it is contemplated that both may be operated simultaneously. Moreover, it is contemplated that both the heater layer 28 and the ventilation system may be operated at various levels (e.g., 2, 3 or more levels of output) such as by having a blower that can operate at different levels or by having various levels of electricity flowing through the heater layer 28. It is also contemplated that the blower 22 may pull air into the open space 38, the passageway 50, the sub-passageways 60 or a combination thereof as well as pushing air into the open space 38, the passageway 50, the sub-passageways 60 or a combination thereof.

It is also contemplated that one or more temperature sensors (e.g., a thermostat) may be included in the seating comfort system. Typically, any temperature sensors are near the trim layers 80, 82 for sensing a temperature closely related to (e.g., at or near) a temperature being experienced by an individual in the seat. In a preferred embodiment, one or more temperature sensors are positioned upon the heater layer 28 or upon the heater element of the heater layer. Also in the preferred embodiment, the one or more temperature sensors are in signaling communication with the control unit 90 such that the control unit 90 can control the blower 22, the heater layer 28 or both for attaining or maintaining a desired temperature at areas adjacent the individual and/or the temperature sensor.

In the preferred embodiment shown, the comfort control system 10 includes a temperature sensor 110 just below the trim layers 80, 82 and in signaling communication with the control unit 90. Advantageously, the control unit 90 is programmed to instruct the system 10 to provide less heat and even cooling in situations where the sensor 110 senses a temperature above one or more predetermined threshold levels. In operation, the control unit 90 may be programmed to instruct the system to provide less cooling or even heating when the sensor 110 senses a temperature below one or more predetermined threshold levels. In a preferred operation mode, when the blower 22 is providing ventilation, the control unit 90 is programmed to instruct the heater layer 28 to turn on and provide heat while the blower 22 remains on if a first undesirably low predetermined temperature is sensed by the sensor 110. Then, if a second predetermined temperature is sensed below the first predetermined temperature, the control unit 90 instructs the blower 22 to turn off while the heater layer 28 continues to provide heat. For each of these situations, the heater layer 28 will typically be instructed by the control unit 90 to continue to provide heat until the temperature sensed by the sensor 110 is at or above the first predetermined temperature and may provide heat until a third predetermined temperature above the first predetermined temperature is sensed.

In another preferred operation mode, when the heater layer 28 is providing heat, the control unit 90 is programmed to instruct the blower 22 to turn on and blow air while the heater layer 28 remains on if a first undesirably high predetermined temperature is sensed by the sensor 110. Then, if a second predetermined temperature is sensed above the first predetermined temperature, the control unit 90 is programmed to instruct the heater layer 28 to turn off while the blower 22 continues to blow air. For each of these situations, the blower 22 will typically be instructed by the control unit 90 to continue to blow air until the temperature sensed by the sensor 110 is at or below the first predetermined temperature and may blow air until a third predetermined temperature below the first predetermined temperature is sensed.

Unless stated otherwise, dimensions and geometries of the various embodiments depicted herein are not intended to be restrictive of the invention, and other dimensions or geometries are possible. Plural structural components step can be provided by a single integrated structure or step. Alternatively, a single integrated structure step might be divided into separate plural components or steps. However, it is also possible that the functions are integrated into a single component or step.

In addition, while a feature of the present invention may have been described in the context of only one of the illustrated embodiments, such feature may be combined with one or more other features of other embodiments, for any given application. It will also be appreciated from the above that the fabrication of the unique structures herein and the operation thereof also constitute methods in accordance with the present invention.

It is understood that the above description is intended to be illustrative and not restrictive. Many embodiments as well as many applications besides the examples provided will be apparent to those of skill in the art upon reading the above description. The scope of the invention should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. The omission in the following claims of any aspect of subject matter that is disclosed herein is not a disclaimer of such subject matter, nor should it be regarded that the inventors did not consider such subject matter to be part of the disclosed inventive subject matter.

What is claimed is:

1. A ventilated seat for a vehicle, comprising:
a vehicle seat having a ventilated component selected from a seat component and a backrest component, at least one of which provides a seat cushion and an air permeable trim surface at occupant contact areas, wherein the seat cushion comprises one or more passageways;
a spacer material located beneath the trim surface;
a heater layer located between the spacer material and the trim surface;
a fluid mover in fluid communication with the spacer material, wherein the fluid mover is a blower configured to push air through the trim surface to an occupant;
at least one duct for providing the fluid communication between the spacer material and the fluid mover; and
a deflector member adjoining the spacer material that diverts the flow of fluid into a plurality of sub-passageways, wherein the sub-passageways are formed in the seat cushion and extend away from the passageway.

2. The ventilated seat of claim 1, wherein the one or more passageways are formed in the material of the seat cushion.

3. The ventilated seat of claim 2, wherein the one or more passageways are formed as channels on the underside of the seat cushion.

4. The ventilated seat of claim 3, wherein the plurality of sub-passageways are formed as through holes in the seat cushion.

5. The ventilated seat of claim 4, wherein the seat cushion, the passageway, the sub-passageways, or combinations thereof include an air impermeable lining or coating.

6. The ventilated seat of claim 5, wherein the heater layer comprises a flexible, substantially flat heating element that allows air to pass thru it.

7. The ventilated seat of claim 6, wherein an adhesive is used in a laminate comprised of the heater layer and the spacer material.

8. The ventilated seat of claim 7, wherein the spacer material comprises a foam material or a polymeric strand material.

9. The ventilated seat of claim 8, further comprising:
a temperature sensor; and
a control unit programmed to:
  i) instruct the heater layer to turn on while the blower remains on if a first temperature is sensed by the temperature sensor;
  ii) instruct the blower to turn off while the heater layer remains on if a second temperature below the first temperature is sensed by the temperature sensor;
  iii) instruct the heater layer to remain on until the first temperature or a third temperature above the first temperature is sensed by the temperature sensor; or
  iv) provide a combination of instructions i) to iii).

10. A ventilated seat for a vehicle, comprising:
a vehicle seat having a ventilated component selected from a seat component and a backrest component, at least one of which provides a seat cushion and an air permeable trim surface at occupant contact areas;
a spacer material located beneath the trim surface;
a heater layer located between the spacer material and the trim surface;
a fluid mover in fluid communication with the spacer material, wherein the fluid mover is a blower configured to push air through the trim surface to an occupant;
at least one duct for providing the fluid communication between the spacer material and the fluid mover, wherein the duct is at least partially provided by the seat cushion and defines a passageway through the cushion; and
a deflector member adjoining the spacer material that diverts the flow of fluid into a plurality of sub-passageways, wherein the sub-passageways are formed as channels in an occupant side of the seat cushion and extend away from the passageway.

11. The ventilated seat of claim 10, wherein the seat cushion, the passageway, the sub-passageways, or combinations thereof include an air impermeable coating.

12. The ventilated seat of claim 11, wherein the heater layer comprises a flexible, substantially flat heating element that allows air to pass thru it.

13. The ventilated seat of claim 12, wherein an adhesive is used in a laminate comprised of the heater layer and the spacer material.

14. The ventilated seat of claim 13, wherein the spacer material comprises a foam material.

15. The ventilated seat of claim 13, wherein the spacer material comprises a polymeric strand material.

16. The ventilated seat of claim 15, wherein the laminate is open at its sides.

17. The ventilated seat of claim 15, further comprising:
a temperature sensor; and
a control unit programmed to:
  i) instruct the heater layer to turn on while the blower remains on if a first temperature is sensed by the temperature sensor;
  ii) instruct the blower to turn off while the heater layer remains on if a second temperature below the first temperature is sensed by the temperature sensor
  iii) instruct the heater layer to remain on until the first temperature or a third temperature above the first temperature is sensed by the temperature sensor; or
  iv) provide a combination of instructions i) to iii).

18. The ventilated seat of claim 17, wherein the control unit is further programmed to:
  i) instruct the blower to turn on while the heater layer remains on if a fourth temperature is sensed by the temperature sensor;
  ii) instruct the heater layer to turn off while the blower remains on if a fifth temperature above the fourth temperature is sensed by the temperature sensor;
  iii) instruct the blower to remain on until the fourth temperature or a sixth temperature below the fourth temperature is sensed by the temperature sensor; or
  iv) provide a combination of instructions i) to iii).

19. The ventilated seat of claim 15, wherein the laminate is an edge sealed bag.

20. The ventilated seat of claim 13 wherein the blower is connected to a mounting surface with a snap fit connection.

* * * * *